United States Patent [19]

Tharaldson

[11] Patent Number: 5,720,352
[45] Date of Patent: Feb. 24, 1998

[54] HITCH FOR TWO UNIT PLANTER

[76] Inventor: James R. Tharaldson, 619 7th Ave. NE, Oelwein, Iowa 50662

[21] Appl. No.: 601,172

[22] Filed: Feb. 14, 1996

[51] Int. Cl.$^6$ .................................................. B60D 1/00
[52] U.S. Cl. ........................ 172/248; 172/310; 172/679
[58] Field of Search .............................. 172/248, 310, 172/677, 679, 776, 439; 56/DIG. 14, 15.1, 396

[56] References Cited

U.S. PATENT DOCUMENTS

| | | | |
|---|---|---|---|
| 2,971,774 | 2/1961 | Bartel | 172/248 X |
| 3,675,945 | 7/1972 | Fischer | 172/248 |
| 4,204,699 | 5/1980 | Gustafson | 172/248 |
| 4,346,909 | 8/1982 | Hundeby | 172/248 X |

OTHER PUBLICATIONS

Erskine Manufacturing Company Inc. Houck Hitch Brochure.
Baker Cultivating America Brochure.
John Deere 750 No-Till Drill 2-Unit Hitch Brochure.
John Deere Drills Brochure, pp. 6-7.
Case International Grain Drills Brochure, pp. 6-7.

*Primary Examiner*—Terry Lee Melius
*Assistant Examiner*—Christopher J. Novosad
*Attorney, Agent, or Firm*—James C. Nemmers

[57] ABSTRACT

A hydraulic hitch for connecting two planters or drills in tandem for planting or in line for transport. The hitch utilizes an overhead beam and stabilizer bar interconnecting the lead and trailing drills to control and guide the drills from one position to the other. This overhead beam is combined with a unique folding tongue and floating tongue tube that are hydraulically operated to allow the operator to conduct the operations from the tractor cab after manually removing safety lock pins.

8 Claims, 7 Drawing Sheets

FIG. 20

HITCH FOR TWO UNIT PLANTER

BACKGROUND OF THE INVENTION

In the modern day and age, crop farmers are highly mechanized and there are available to them a variety of attachments to aid in the planting and harvesting of their crops. Farmers who raise such grains as wheat, oats, barley, rye, peas, etc. use grain drills to plant the seeds, towing the attachments behind the tractor. Uniformity and depth of planting of the seeds is somewhat critical for many grains, and drills have been developed that will accurately meter the rate of planting of the seeds and plant them to the desired depth. To aid in the speed and efficiency of planting, these grain drills come in units of different widths that can be towed singularly or in multiples behind a tractor. The widths of the drills are limited by the ability to transport the units over the road and to fit the units through machine shed doorways and fence gates. Obviously, the units that are narrower in width add considerably to the planting time and adversely affect the farmer's efficiency. Therefore, there have been developed hitches that allow the narrower units to be connected in tandem during planting and then towed in line during transport. With the early hitches, connection and reconnection between the transport and planting positions was done manually and required considerable time and effort on the part of the operator. In recent years, there have been developed a variety of hydraulic hitches which simplify the change from transport to planting position and from planting to transport position. The known hydraulic hitches of this type utilize hydraulically operated linkage that extends around the side of the lead unit with the linkage being attached to one corner of the trailing unit. Although these hydraulic hitches do provide for improved efficiency in changing from planting to transport positions and transport to planting positions, they have the disadvantages of leaving a gap between the units when mounted in tandem in the planting position. With some of the units, this results in a strip that is not planted. A further disadvantage is that the weight of the linkage at one corner of the lead drill affects the depth of planting unless suitable counterweights are provided. Since planting of seeds at the proper depth is a precise and critical operation, it is desirable that the drills be substantially balanced during planting.

There is therefore a need for an improved hydraulic hitch system that will allow the operator to quickly and easily move the towed drills from a transport to a planting position and from a planting to a transport position without leaving the tractor cab.

There is a further need for an improved hydraulic hitch system which allows the operator to more easily conduct the change-over from one position to another.

There is a further need for an improved hydraulic hitch system that will allow the two units when in planting position to plant uniform rows leaving no gap between the two units.

There is a further need for an improved hydraulic hitch which will provide for a more weight-balanced linkage thus eliminating the need for counterweights.

SUMMARY OF THE INVENTION

The hydraulic hitch of the invention eliminates any linkage that extends around the side of the lead drill. In its place, the hydraulic hitch of the invention utilizes an overhead beam and stabilizer bar that is substantially centrally located and inter-connects the lead drill to the towing bar of the trailing drill. This overhead beam is pivotly connected between the two units, and when combined with a unique folding linkage on the lead drill, allows the operator without leaving the tractor cab to maneuver the trailing drill into a tandem position and lock it in place. Similarly, when it is desired to change the drills from the planting position to the transport position, the operator can conduct the operation entirely from the tractor cab, it being necessary for the operator to leave the tractor cab only to remove or place safety lock pins. The folding tow bar linkage of the lead drill includes a floating tongue tube and a sliding linkage arrangement that through the use of the hydraulic cylinders provides a towing linkage that is substantially centrally located when the two drills are in planting position.

DESCRIPTION OF THE PREFERRED EMBODIMENT OF THE INVENTION

The purpose of the invention is to provide an improved hitch for inter-connecting two planters or drills that are used in planting seeds of all types in rows at a selected depth. There are numerous manufacturers of such drills, and the principles of the invention are applicable to drills of any type as long as they are provided with the towing components, including the linkage mechanisms, that are described hereinafter.

Figure 1:
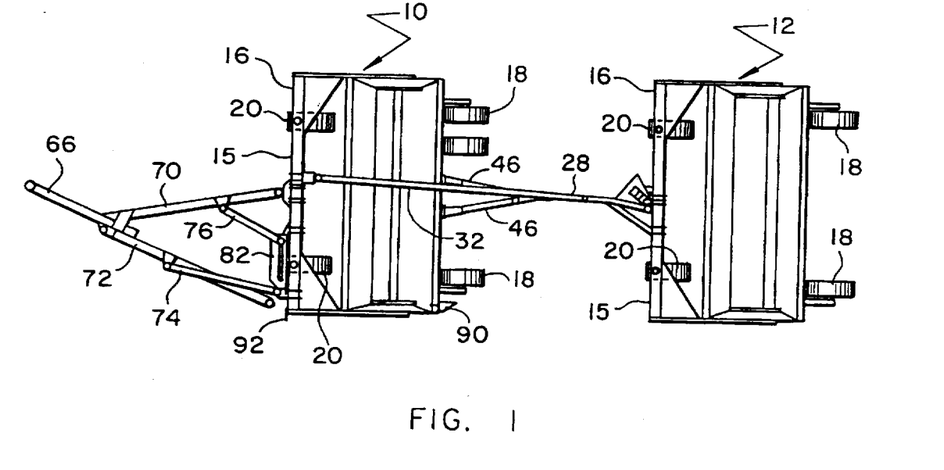
FIG. 1 is a top plan view of two drills connected in the transport position.
Figure 2:
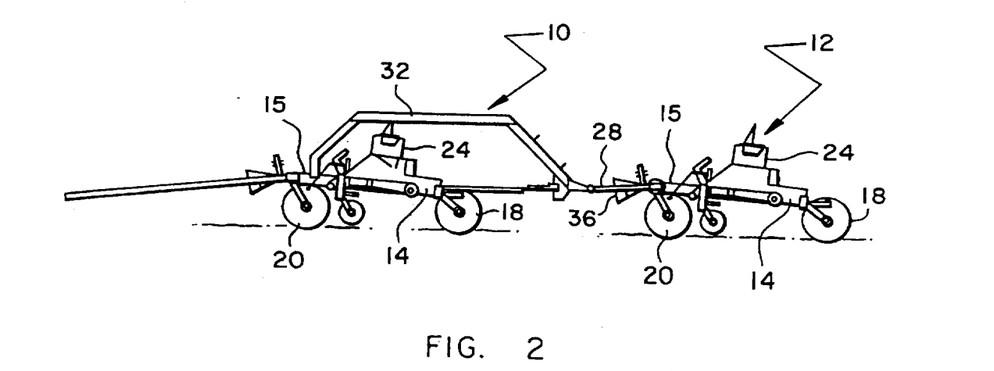
FIG. 2 is a side elevational view of two drills connected in the transport position.

With reference now to the drawings, and particularly to FIG. 1 and FIG. 2, there is illustrated a lead drill, indicated generally by the reference numeral 10 and trailing drill indicated generally by the reference numeral 12. Since the particular construction and the basic components of these drills are well known to those skilled in the art, only the components of the drills 10 and 12 necessary to understand the principles of the invention will be described. Also, not all components of the drill necessary to carry out the planting operation are shown and described hereinafter since the detailed components, such as the disk openers and closers, press wheels and seed metering mechanisms are well known to those skilled in the art and vary from manufacturer to manufacturer. For purposes of understanding the hitch of the invention, each drill 10 and 12 has a main frame 15 to which there are attached the seed hopper, mechanism for metering the seed, openers to create furrows and press wheels for covering the seed. The main frame 15 of each drill 10 and 12 is supported in the rear by stationary wheels 18. The front of the main frame 15 is supported by a dolly cart 14 having a front frame member 16. The dolly cart 14 is in turn supported by front wheels 20 mounted on swivel legs that allow each of the drills 10 and 12 to turn more easily. These components are well known to those skilled in the art and vary from manufacturer to manufacturer. It also is well known that seed depth is critical to proper germination and emergence of the seeds, and drills are commonly provided with the necessary means for varying the planting depth of the seeds depending upon the grain being planted and the soil conditions.

The invention relates to a means for inter-connecting the lead drill 10 and the trailing drill 12 so that they can be transported in line and then moved quickly and easily into a tandem position for planting. With the hitch mechanism of the invention, moving of the drills 10 and 12 from one position to the other can be accomplished by the operator from the tractor cab. The only time the operator must move from the cab is to remove or place safety lock pins as described hereinafter.

Figure 10:
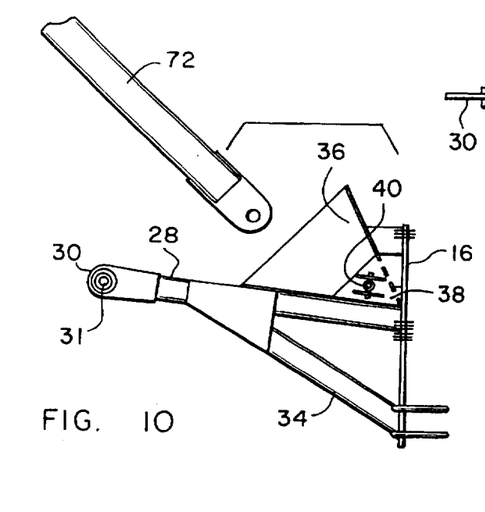
FIG. 10 is a top or plan view of another portion of the folding tongue mechanism of the lead drill and illustrating the floating tongue tube and receiver.
Figure 11:
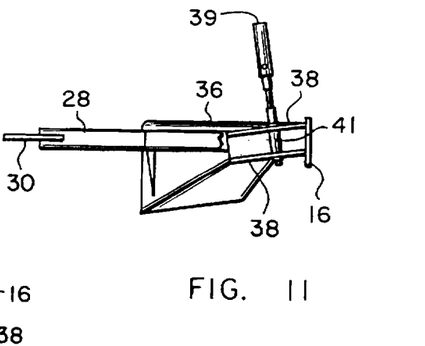
FIG. 11 is a side elevational view of the mechanism of FIG. 10 with a portion of the hitch bar broken away to illustrate the receiver.

In order to accomplish the purpose of the invention, each of the drills 10 and 12 must be provided with towing linkages substantially as disclosed herein. Referring first to the trailing drill 12, and referring particularly to FIGS. 1, 10 and 11, there is attached to the front dolly cart 14 a forwardly extending hitch bar 28 that has a tongue 30 extending from its outer end. The tongue 30 has a ball joint pivot 31 that provides for pivotal connection of the hitch bar 28 to the overhead beam 32 (see FIGS. 2 and 4). An angular extending brace 34 is connected between the outer end of the hitch bar 28 and the dolly cart 14 of drill 12. The hitch bar 28 and the brace 34 are connected to each other and to the dolly cart 14 in any suitable manner such as by welding. There is also secured to the hitch bar 28 an obelisk-shaped receiver 36 that terminates in a pair of parallel locking plates 38 each of which contains a vertically extending opening 40. The purpose of the receiver 36 is to provide for an automatic connection of the trailing drill 12 and lead drill 10 in the manner more fully described hereinafter.

Figures 3, 4, 5, 6, 7, 8, 9:
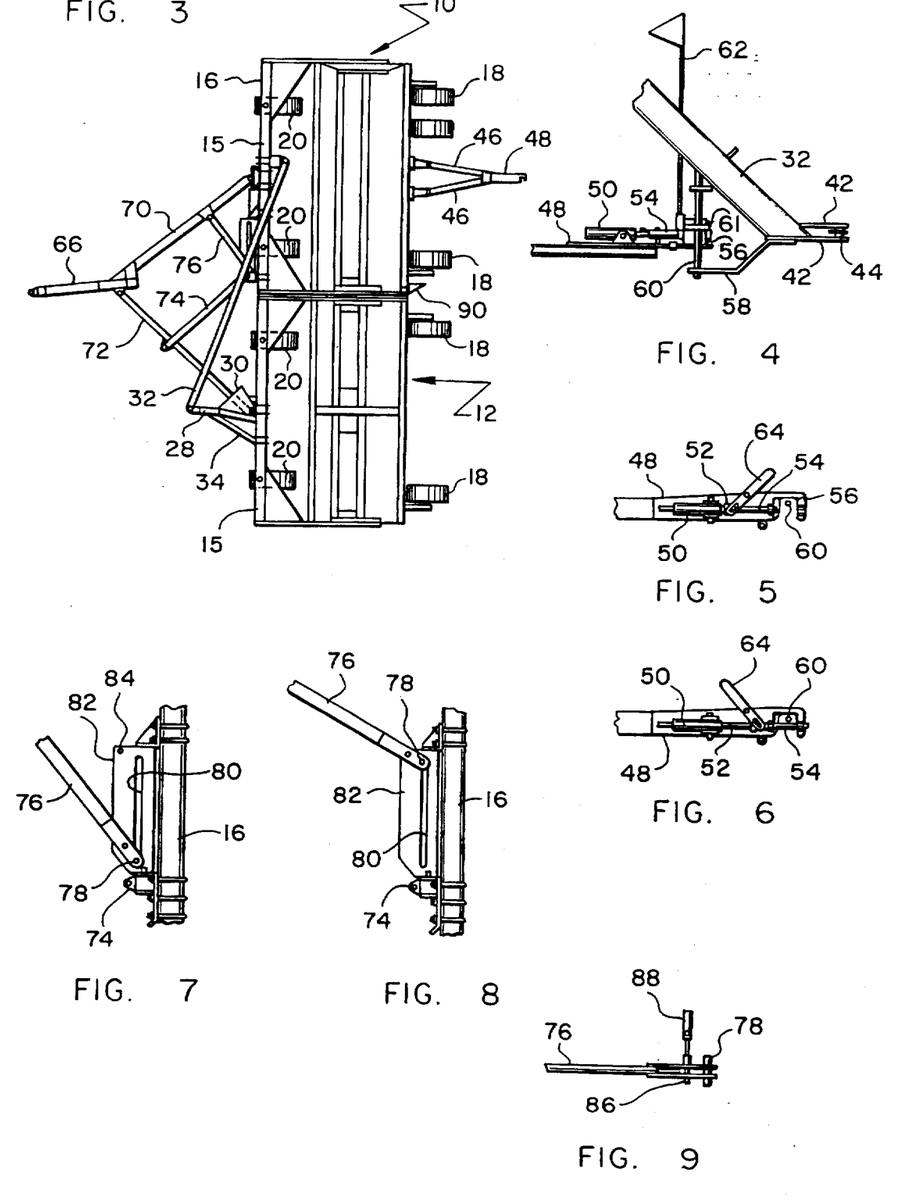
FIG. 3 is a top or plan view of two drills connected in the planting position.
FIG. 4 is a side elevational view of a portion of the interconnection between the lead and trailing drills to show the transport lock mechanism.
FIG. 5 is a top view of the transport lock connection showing the cylinder retracted into the unlocked position.
FIG. 6 a top view similar to FIG. 5 but showing the cylinder extended into a locked position.
FIG. 7 is a top view of a portion of the folding tongue of the lead drill and illustrating the slide arm lock mechanism and showing the folding tongue in the planting position.
FIG. 8 is a view similar to FIG. 7 but showing the folding tongue in the road transport position.
FIG. 9 is a side elevational view a portion of the slide arm mechanism of FIGS. 7 and 8 and illustrates the locking pin and cylinder.

Referring now to FIGS. 2 and 4, the rearward extending end of the overhead beam 32 contains a pair of vertically spaced apart plates 42 that receive the tongue 30 of the hitch bar 28 which is then pinned to the plates 42 by pin 44 to pivotly connect them. It will be understood that this connection provides a permanent pivotal connection between the trailing drill 12 and the lead drill 10 during both the planting and transport positions.

Referring now to FIGS. 1, 2, 3 and 4, there is shown the connecting linkage between the lead drill 10 and trailing drill 12 during the transport position. Connected to the rear of the dolly cart 14 of the lead drill 10 are a pair of rearwardly extending tow bars 46 that are welded or otherwise suitably fixed at spaced-apart points to the dolly cart 14. The tow bars 46 are pivotly connected at their outer or rearwardly extending ends to a single connector plate 48. As best seen in FIGS. 4, 5 and 6, the connector plate 48 supports a hydraulic cylinder 50 that has a rearwardly extending operating rod 52 with a connecting pin 54 affixed to its outer end. At the outer end of the connecting plate 48 there also is affixed a U-shaped connector 56 that is open to one side as best seen in FIGS. 5 and 6. The U-shaped connector 56 has a pair of horizontal openings aligned with the pin 54 so that when the hydraulic cylinder 50 is operated to extend the operating rod 52, the connecting pin 54 will be inserted in the openings in the U-shaped connector 56 (see FIG. 5). Similarly, when the hydraulic cylinder 50 is actuated to withdraw the operating rod 52, the pin 54 will be withdrawn from the open interior of the U-shaped connector 56 (see FIG. 6). As best seen in FIG. 4, the overhead beam 32 has a support plate 58, and a locking rod 60 that extends vertically upwardly from the support plate 52 and is connected to the overhead beam 32. The locking rod 60 is of a size that will easily slip inside the open interior of the U-shaped connector 56. As seen in FIGS. 4, 5 and 6, when the locking rod 60 is positioned inside of the U-shaped connector 56, the cylinder 50 can be actuated to move the connecting pin 54 into place thus locking the locking rod 60 inside of the connector 56 and securing the lead drill 10 to the trailing drill 12. This connection is necessary during the transport position of the lead drill 10 and trailing drill 12. Otherwise, because of the pivotal connection between the overhead beam 32 and the hitch bar 28, the trailing drill 12 could not be properly controlled during transport. As an additional safety measure, a safety locking pin 61 (FIG. 4) can be manually inserted in place in the connector 56 when the drills 10 and 12 are in the transport position.

If desired, an indicator flag 62 (see FIG. 4) can be provided so that its movement will indicate to the operator whether or not the connecting pin cylinder 50 is being operable to move the pin 54 from a locking position or retracted position. The indicator flag is connected by a connecting rod 64 that has one end pivotly connected to the operating rod 52 of the cylinder 50 thus moving the indicator flag 62 when the cylinder 50 is actuated.

Referring now to FIGS. 1, 2, 3, 7, 8 and 9, the linkage for the lead drill 10 will now be described. This linkage is sometimes referred to as the "folding tongue" linkage. A tow bar 66 provides for a connection of the lead drill 10 directly to the hitch of the towing vehicle such as a tractor 68, a representation of which is shown in FIGS. 12–20. The trailing end of the tow bar 66 has affixed to it a brace 70 the rearward end of which is pivotly connected to the dolly cart 14 of the lead drill 10. Pivotly connected at its forward end to the tow bar 66 is the floating tongue tube 72. As best seen in FIG. 1, when the drills 10 and 12 are in the transport position, the rearward end of the tongue tube 72 is not connected, but can swing or "float". Preferably, as a safety measure and to prevent the tongue tube 72 from floating during transport, its rearward end is removably attached to a support bar 74 which has its forward end pivotly connected to the floating tongue tube 72 and its rear end pivotly connected to the dolly cart 14. The tongue tube 72 is removably attached to the support bar in any suitable manner so that a simple safety lock pin (not shown) can be manually removed by the operator just before starting the changeover from the transport position to the planting position.

A folding tongue member 76 has its forward end connected to the brace 70 while its rearward end has a vertical guide pin 78 slideable in a guide slot 80 in a guide plate 82 that is affixed to the dolly cart 14. The guide plate 82 also has a vertically extending opening 84 that receives a locking pin 86 connected to the operating rod of a vertically extending hydraulic cylinder 88 (see FIG. 9). The purpose of the hydraulic cylinder 88 and locking pin 86 is to lock the folding tongue member 76 in the transport position when the cylinder 88 is extended by inserting the locking pin 86 into the opening 84. FIG. 8 shows the folding tongue member 76 locked into position in the transport position while FIG. 7 shows the folding tongue member 76 in the planting position.

The dimensions and position of the overhead beam 32 relative to the two drills 10 and 12 are such as to provide for and control movement of the trailing drill 12 from an in-line position behind the lead drill 10 (the transport position) to a position immediately to the left and aligned with the lead drill 10 ( the planting position). The relative movement of the drills 10 and 12 is thus controlled by the overhead beam 32 as the tractor 28 is driven by the operator through the following described steps. In describing these steps, the function of the various linkages which provide for both the transport and planting positions and movement from one position to the other will be described with reference particularly to FIGS. 12 through 20.

Figure 12:
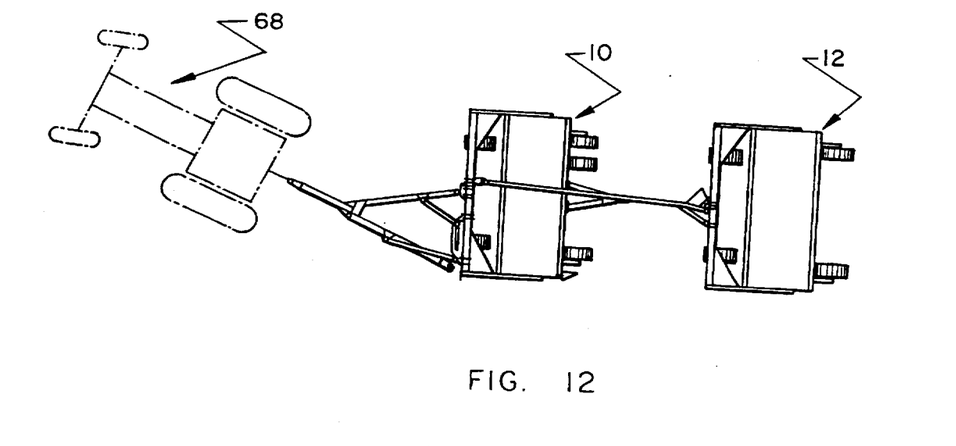
FIG. 12 is a top or plan view showing the initial movement in the first step to change the drills from a transport to a planting position.

FIG. 12 shows the lead drill 10 and trailing drill 12 in a transport position and illustrates the first step in maneuvering the drills from the transport position to the planting position. Preferably, the maneuvering from the transport position to the planting position is done on a level, smooth area to avoid movement of the trailing drill 12 out of control of the overhead beam 32. A smooth area is preferred so that unevenness in the terrain will not adversely affect the pivotly mounted front wheels 20 of the trailing drill 12 so as to change its position and make it more difficult to guide into the planting position. Generally, the overhead beam 32 provides the necessary force and maneuvering to steer the trailing drill 12 around the lead drill 10 if the tractor 68 is moved as described hereinafter.

Figure 13:
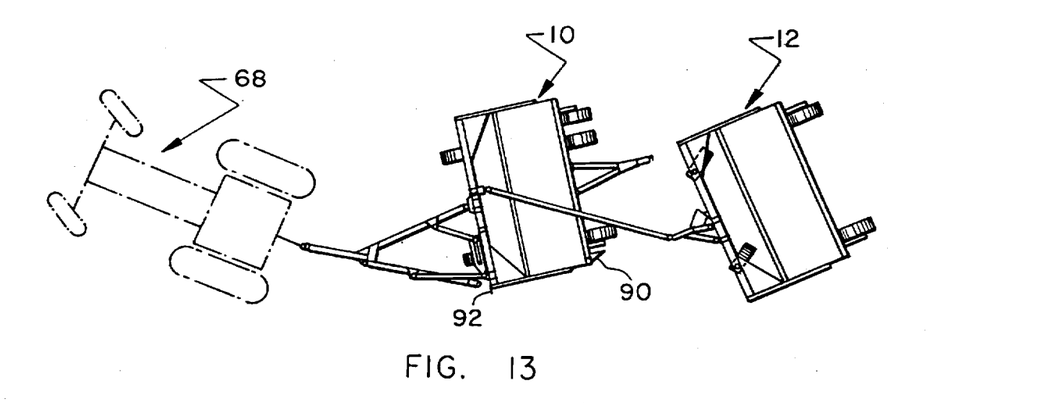
FIG. 13 is a top or plan view showing the second step in moving the trailing drill to a planting position alongside the lead drill.

With the lead drill 10 and trailing drill 12 in a straight line in the transport position, and resting on flat smooth ground in the field that is to be planted, the tractor 68 is pulled ahead slightly and then the tractor only is turned approximately 30 degrees to the right and stopped. With the tractor 68 stopped, the front wheels of the tractor are turned to the left of center approximately 30 degrees. This position is shown in FIG. 12. The operator at this point must exit the tractor cab and manually remove the safety lock pin from the folding tongue member 76 and remove the rear transport lock pin 61. The operator then returns to the tractor cab and activates the hydraulic cylinder 50 on the tow bar 46 to retract the pin 54 and allow the locking rod 60 to move out of the U-shaped connector 56. The indicator flag 62 will give visual indication of the cylinder movement as illustrated in FIG. 13, and the operator then backs the tractor 68 up very slowly causing the lead drill 10 and the trailing drill 12 both to travel in a reverse direction. As illustrated in FIG. 13, the trailing drill 12 is now freed from the tow bars 46 of the lead drill 10. Because of the 30 degree position of the tractor 68 and the position of the steering wheels turned approximately 30 degrees to the left, the lead drill 10 will start moving in a direction opposite to that of the tractor 68. As the tractor 68 continues to back up, the lead drill 10 will continue to move in the reverse direction, but the overhead beam 32 will start forcing the trailing drill 12 out and around to the left of the lead drill 10. When the trailing drill 12 has started this motion out and to the left, the operator will turn the steering wheel of the tractor 68 to the right of center so that the tractor 68 will follow the path of the lead drill 10. (See FIG. 13).

Figure 14:
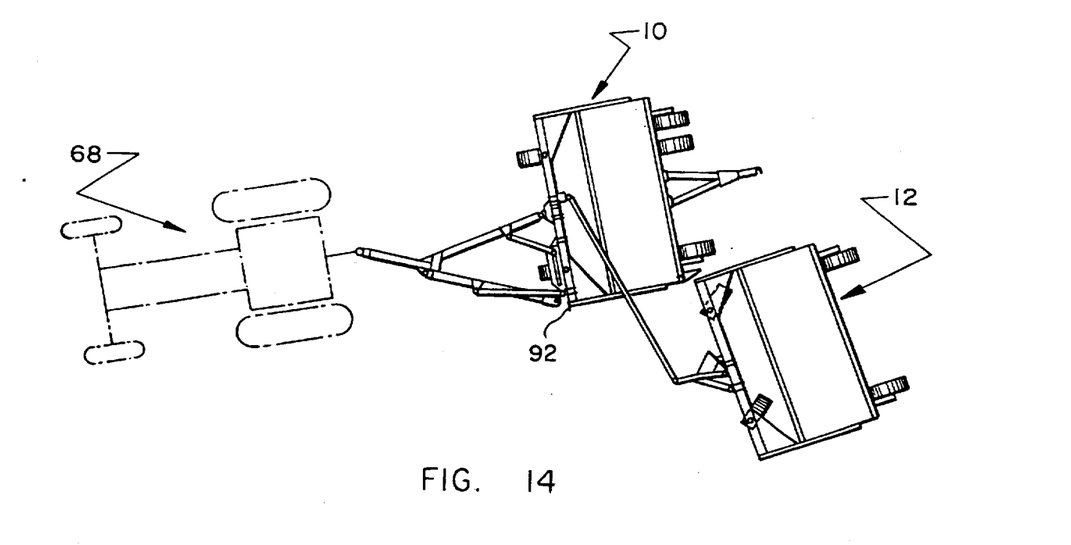
FIG. 14 is a top or plan view illustrating the third step in moving the two drills into a planting position.
Figure 15:
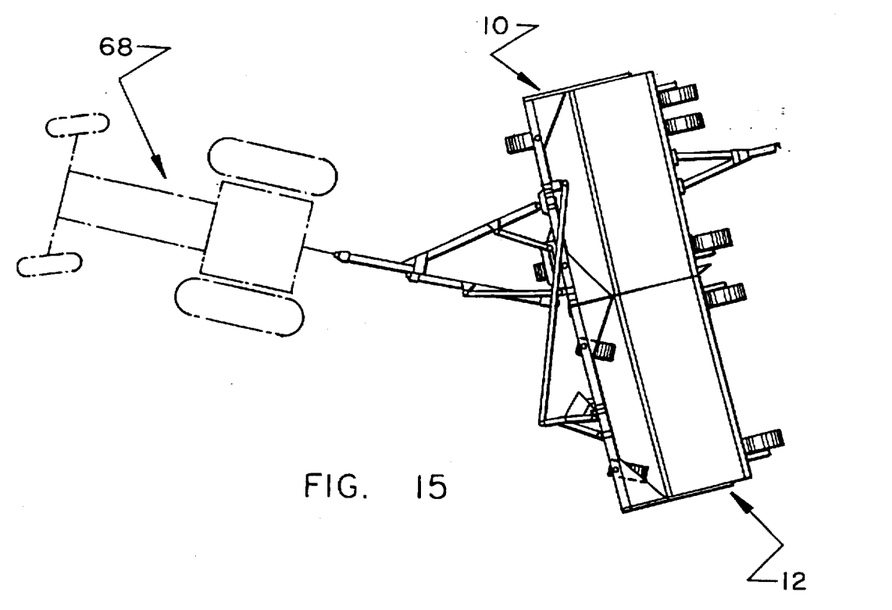
FIG. 15 is a top or plan view illustrating the fourth step in moving the drills into a planting position.

As illustrated in FIG. 14, as the tractor 68 continues to move the lead drill 10 in the reverse direction, the lead drill 10 will start to back alongside of the trailing drill 12. The two drills must be as close together as possible to enable the folding tongue linkage of the lead drill 10 to work successfully, and the dimensions and geometry of the overhead beam will provide the necessary control. However, if the two drills get too close to each other, there has been provided a guide bar 90 (FIG. 13) at the left rear corner of the lead drill 10 which will tend to push the trailing drill 12 to the left so that it clear the lead drill 10. As the tractor 68 continues its reverse movement, the steering wheels of the tractor should be turned straight so that overhead beam 32 will still steer the trailing drill 12 into position just to the left of the lead drill 10. As best seen in FIG. 1 (as well as FIGS. 12–20) the left front corner of the lead drill 10 is provided with a stop arm 92 that will engage the right front corner of the dolly cart 14 of the trailing drill 12 to stop its further movement. If the trailing drill 12 is too far to the left and misses engagement with the stop arm 92, the operator must stop the tractor 68, pull forward a short distance, and back up again. As illustrated in FIG. 15, the steering wheels of the tractor 68 should be turned to the left of center just before the trailing drill 12 engages the stop arm 92. As soon as the trailing drill 12 engages the stop arm 92, the tractor 68 is stopped.

Figure 16:
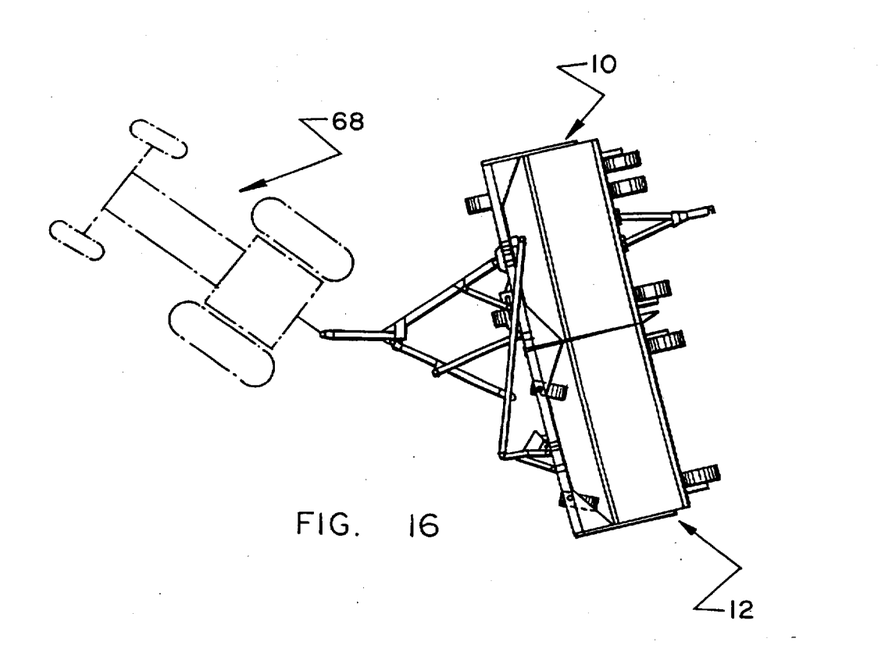
FIG. 16 is a top or plan view illustrating the fifth step in moving the drills into a planting position.
Figure 17:
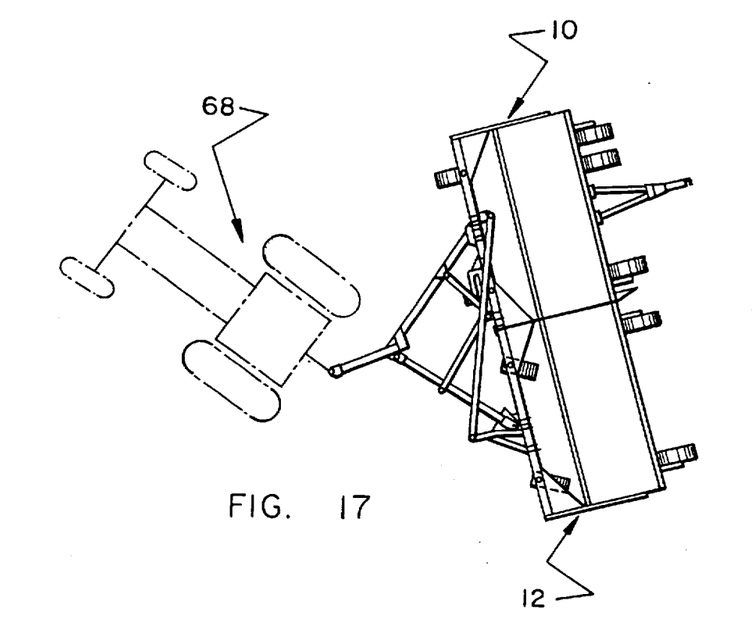
FIG. 17 is a top or plan view illustrating the final step in completing the change of the drills from a transport position to a planting position.

FIG. 16 illustrates that when the lead drill 10 and trailing drill 12 are properly positioned, the operator should turn the steering wheels of the tractor 68 straight. At this time, the operator actuates the hydraulic cylinder 39 to retract the pin 41 from the locking plates 38 in the receiver 36 and also actuates the cylinder 88 to retract the pin 86 from the guide plate 82. As illustrated in FIGS. 16 and 17, the operator of the tractor 68 should now backs up very slowly, and the floating tongue tube 72 will start to slide to the left. Continued backing of the tractor 68 will cause the floating tongue tube 72 to enter the receiver 36. At the same time, the folding tongue member 76 has also moved to the left, being guided by the guide pin 78 in the guide slot 80. When the guide pin 78 has moved completely to the left of the guide slot 80, the operator of the tractor 68 stops reverse motion of the tractor 68. At this time, the operator actuates the hydraulic cylinder 88 to extend the locking pin 86 so as to lock the folding tongue member 76 into planting position to the far 36, left of the guide slot 80. If the floating tongue tube 72 has not bottomed out in the receiver the operator of the tractor 68 may have to reverse the tractor 68 slightly. When the floating tongue tube 72 has bottomed out in the receiver 36, the hydraulic cylinder 39 is actuated to extend the locking pin 41 into the locking plates 38. The drills 10 and 12 are now ready for the planting operation.

Figure 18:
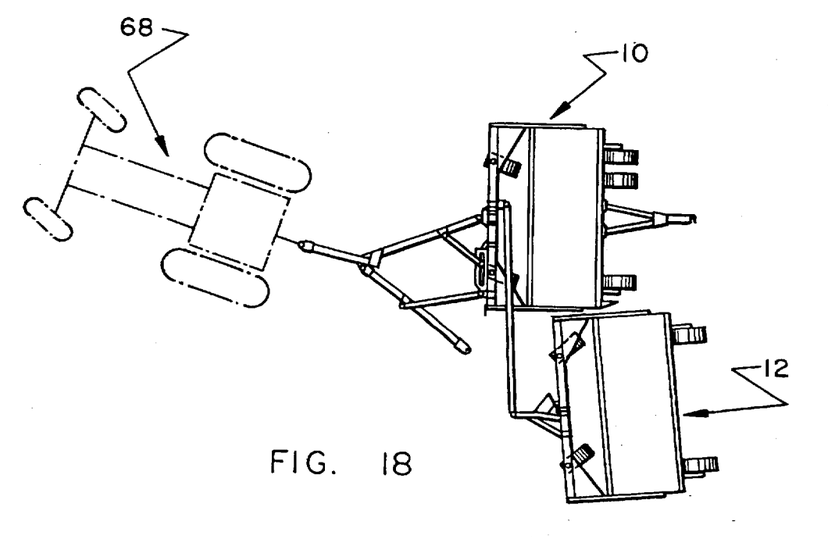
FIG. 18 is a top or plan view illustrating the first step in moving the drills from a planting position to a transport position.
Figure 19:
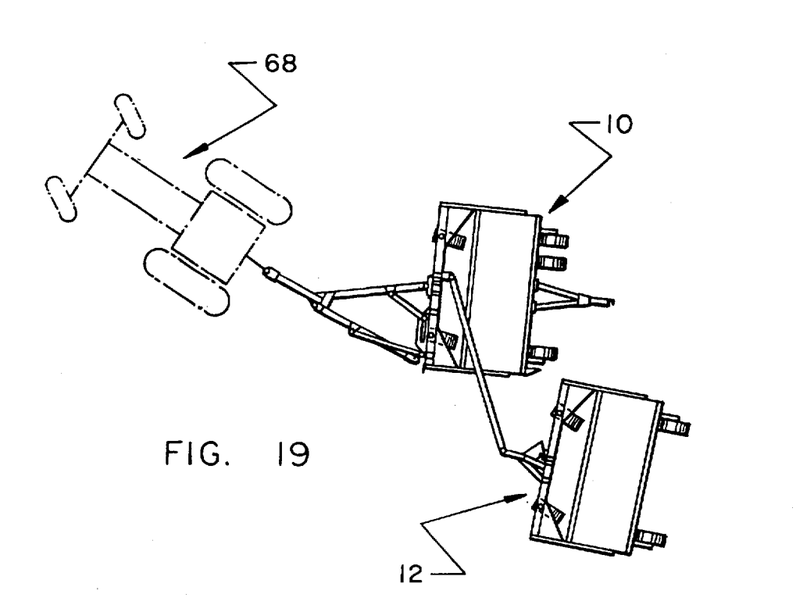
FIG. 19 is a top or plan view illustrating the second step in moving the drills from a planting position to a transport position.
Figure 20:
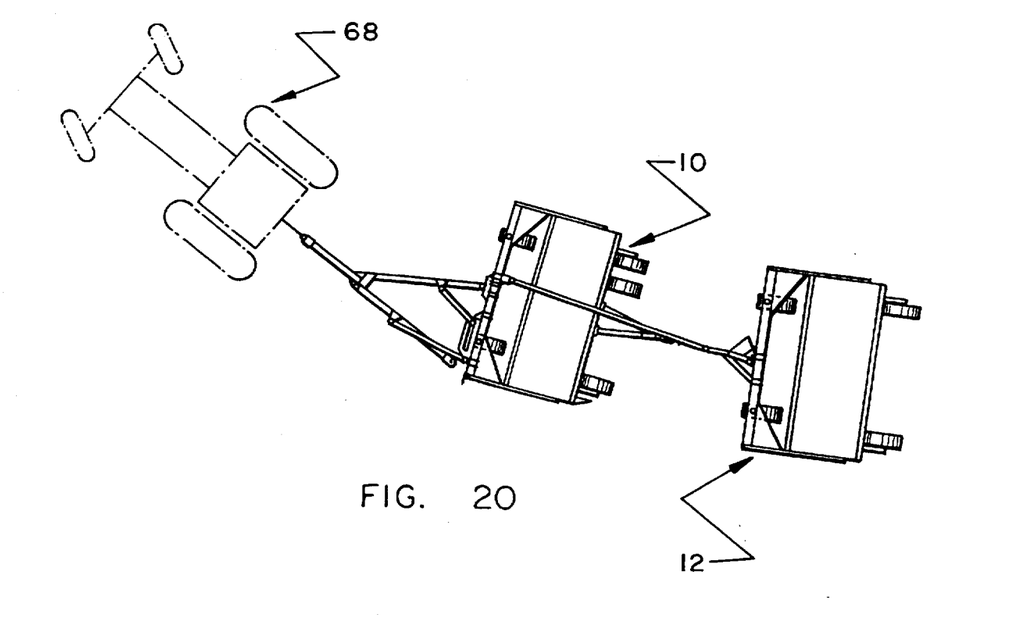
FIG. 20 is a top or plan view illustrating the final step in moving the drills into a transport position.

FIGS. 18, 19 and 20 illustrate the steps in moving the drills 10 and 12 from the planting position to the transport position. FIG. 17 shows the drills 10 and 12 in the planting position, and FIG. 18 illustrates the first step in moving the drills into the transport position. Before starting the first step of FIG. 18, the drills should be pulled onto flat ground with the tractor 68 in a straight line with the two drills 10 and 12. The operator then pulls the tractor 68 ahead slightly turning to the right and then stops. The operator then actuates the cylinder 39 to release the locking pin 41 from the locking plates 38 in the receiver 36. At the same time, the operator actuates the cylinder 88 to release the locking pin 86 to permit the guide pin 78 to slide freely in the guide slot 80 of the guide plate 82. As the operator continues to move the tractor 68 ahead, the floating tongue tube 78 will exit the receiver 36 and start swinging toward the lead drill 10. The folding tongue 76, guided by the guide pin 78 in slot 80, will move to the far right of the guide slot 80. The lead drill 10 will then start moving ahead of the trailing drill 12, and the forward motion of the lead drill 10 will force the overhead beam 32 to push the trailing drill 12 away from the lead drill 10. This is shown in FIG. 18.

When the guide pin 78 has reached the end of the guide slot 80 of the guide plate 82, the operator stops forward movement of the tractor 68 and actuates the hydraulic cylinder 88 to extend the locking pin 86 into the opening 84 and lock the folding tongue member 76 to the guide plates 82. This is the transport position of the folding tongue 76. Continued forward movement of the tractor 68 while turning the steering wheels to the right will pull the lead drill 10 past the trailing drill 12. At the same time, the drag of the trailing drill 12 will pull the overhead beam 32 around until the locking rod 60 is seated into the pocket of the U-shaped connector 56 of the tow bar 46. The operator will be able to see the position of the indicator flag 62, and when it wiggles from the impact of the stopping of the sideways motion of the locking rod 60 as it engages in the pocket of the U-shaped connector 56, this is the signal for the operator to actuate the hydraulic cylinder 50 to extend the connecting pin 54 into the locking position. Movement of the indicating flag 62 will show movement of the locking pin 54 and the operator will know that the drills are connected. The operator must now exit the cab of the tractor 68 and insert and secure the safety pin 61 into the connector 56 and connect the floating tongue tube 72 to the support bar for safe road transport.

From the foregoing description, it is evident that the linkage mechanism of the invention provides for a simple and easy transition of the drills from transport position to planting position and from planting position to transport position. Because the overhead beam 32 is attached at or near the centers of the two drills as shown in the drawings, there is no necessity for counterweights to balance the heavy linkage systems of the prior art which extend around the sides of the drills. Therefore, this arrangement of balanced linkage assures precise planning depth without the use of counterweights. Moreover, elimination of linkage around the side of the drills allows the two drills to be joined tightly together leaving no space when in the planting position. This provides for uniform planting with no missed row. Also, from the foregoing description, it is evident that the entire operation can be conducted by the operator from the tractor cab. The only time the operator needs to exit the cab is to remove or place the safety pins that are used to assure safe transport.

Having this described the invention in connection with the preferred embodiments disclosed herein, it will be evident to those skilled in the art that various revisions and modifications can be made to the preferred embodiments without departing from the spirit and scope of the invention. It is my intention, however, that all such revisions and modifications that are obvious to those skilled in the art will be included within the scope of the following claims.

What is claimed is as follows:

1. A hitch system for use in combination with a lead drill and a trailing drill pulled by a towing vehicle and which drills are movable from a planting position when used in planting seeds to a transport position when towed over the road, the drills being connected in tandem when in the planting position and being connected in line when in the transport position with the lead drill ahead of the trailing drill, each of the drills having a main frame supported in the rear by stationary wheels and in the front by a dolly cart mounted on wheels turnable on swivel legs to provide for turning, said hitch system comprising a hitch bar extending forwardly from the main frame of the trailing drill, an overhead beam of a height to extend over the drills and having a forward end and a rear end, the forward end of the beam being pivotally connected to the main frame of the lead drill near the front center of the main frame and the rear end of the overhead beam being pivotally connected to the hitch bar of the trailing drill, a rear tow bar affixed to the rear of the main frame of the lead drill and extending rearwardly therefrom, the rear end of the rear tow bar being releasably connectable to the rear end of the overhead beam, a front tow bar for the lead drill, the front tow bar having a forward end adapted for connection to the towing vehicle, a brace connected between the front tow bar and the main frame, a floating tongue tube pivotally connected at its forward end to the front tow bar and releasably connected at its rear end to the main frame of the lead drill, a support bar pivotally connected at one end to the floating tongue tube between the ends of the floating tongue tube and connected at its other end to the main frame of the lead drill, a guide plate affixed to the main frame of the lead drill and having a guide slot therein extending generally transversely to the normal direction of travel of the drills, a folding tongue member having one end connected to the brace between its ends with the other end slidably connected to the guide plate so that other end of the folding tongue member is slidable back and forth in the guide slot, first locking means to lock the other end of the folding tongue member at selected places in the guide slot, a receiver secured to the main frame of the trailing drill near its connection to the hitch bar, the receiver being constructed so as to receive the rear end of the floating tongue tube when the tongue tube is disconnected from the lead drill and the lead drill and trailing drill are side-by-side in a planting position, and second locking means to secure the rear end of the floating tongue tube in the receiver when the drills are in a planting position.

2. The hitch system of claim 1 in which the receiver includes a housing having an inner end and an outer end that diverges forwardly from and toward the right of the trailing drill, the housing positioning the floating tongue tube for engagement with the second locking means.

3. The hitch system of claim 2 in which the inner end of the receiver is combined with a movable locking pin, and a hydraulic cylinder is operatively connected to the locking pin to move the pin into and out of locking engagement with the floating tongue tube.

4. The hitch system of claim 1 in which the first locking means includes a hydraulic cylinder mounted on the rear tow bar, and a locking pin is operatively connected to the hydraulic cylinder and movable by the cylinder into and out of locking engagement with the guide plate and folding tongue member to lock the folding tongue member in a selected position in the guide slot when the lead drill and trailing drill are in the planting position or the transport position.

5. The hitch system of claim 1 in which there is a hydraulic cylinder mounted on the rear tow bar and a locking pin is operatively connected to the hydraulic cylinder to releasably connect the rear tow bar to the rear end of the overhead beam.

6. The hitch system of claim 1 in which the forward end of the overhead beam is pivotally connected to the main frame of the lead drill at a point to the right of center of the main frame.

7. The hitch system of claim 1 in which there is combined with the main frame of the lead drill a stop member located at the left front corner of the main frame, the stop providing for the proper positioning of the trailing drill and the lead drill when the drills are in the planting position.

8. The hitch system of claim 1 in which there is combined with the main frame of the lead drill a guide bar extending rearwardly from the left rear corner of the main frame of the lead drill, the guide bar forcing the trailing drill alongside the left side of the lead drill as the trailing drill moves from transport position to planting position along the left side of the lead drill.

* * * * *